United States Patent [19]

Tynan et al.

[11] 3,851,174

[45] Nov. 26, 1974

[54] LIGHT DETECTOR FOR THE NANOSECOND-DC PULSE WIDTH RANGE

[75] Inventors: Eugene Edward Tynan, Mahopac; Robert J. Von Gutfeld, New York, both of N.Y.

[73] Assignee: International Business Machines Corporation, Armonk, N.Y.

[22] Filed: May 4, 1973

[21] Appl. No.: 357,317

[52] U.S. Cl. .................................. 250/336, 250/338

[51] Int. Cl. .................................................. G01j 3/00

[58] Field of Search ........... 250/330, 332, 338, 339, 250/340, 336

[56] References Cited

UNITED STATES PATENTS

| | | | |
|---|---|---|---|
| 2,935,711 | 5/1960 | Christensen | 250/338 X |
| 2,951,175 | 8/1960 | Null | 250/338 X |
| 3,122,642 | 2/1964 | Hitchcock | 250/330 |
| 3,452,198 | 6/1969 | White | 250/338 X |

*Primary Examiner*—Archie R. Borchelt
*Attorney, Agent, or Firm*—Thomas J. Kilgannon, Jr.

[57] ABSTRACT

A light detector consisting of a thin film of metallic (or conducting) material having an induced anisotropy in conjunction with means for establishing a temperature gradient in the film in a direction normal to the plane of the film is disclosed. When thin films of molybdenum and tungsten are excited by a pulsed laser light at normal incidence to the film, transverse thermoelectric voltages are generated. Output voltages across a 50 ohm load of 10 millivolts have been observed for an incident laser pulse of approximately 1 KW. Wave lengths in the range of 0.46–1.06$\mu$m and pulse widths of approximately 3 to 300 nanoseconds produce output voltages. A correlation between intrinsic film stress and output voltage indicates that stress (one of induced anisotropy) in the metal film introduced during deposition or externally induced anisotropy such as can be produced by a magnetic field in magnetic materials gives rise to a nonscalar absolute thermoelectric power even though the metal films are usually considered to be isotropic in their transport properties. The output from the detector, in terms of polarity, may be reversed by reversing the direction of light incidence. Also, the direction and magnitude of the output may be controlled by adjusting the position of the metallic film relative to a pair of contacts disposed in sliding relationship with the metallic film. While not necessary to the practice of the present invention, an electrically insulating substrate is preferably used to cause a better temperature gradient normal to the plane of the film. In general, the response time of the films is dependent on the laser pulse width.

34 Claims, 12 Drawing Figures

LIGHT DETECTOR FOR THE NANOSECOND-DC PULSE WIDTH RANGE

BACKGROUND OF THE INVENTION

1. Field of the Invention

This invention relates generally to electromagnetic wave detectors and more specifically relates to detectors which are useful in the infrared range of the electromagnetic spectrum and are capable of operation at or near room temperature. Still more specifically it relates to an electromagnetic wave detector which is formed from a layer of vacuum evaporated metal which is preferably a refractory or high melting point metal.

Still more specifically, it relates to vacuum evaporated films of metallic material which have an induced anisotropy which can result from the vacuum deposition itself or can result from an external source such as a magnetic field. Also, the resulting films, having an induced anisotropy from whatever process or external source, are capable of producing a transverse output voltage provided a temperature gradient can be established normal to the plane of the film. Thus, a metallic film alone in combination with an extremely short pulse laser can produce an output voltage pulse. Similarly, the same metallic film deposited on a dielectric substrate also provides an output voltage in response to the formation of a thermal gradient in the film and the insulating substrate material. This last arrangement is a preferred embodiment inasmuch as the amplitude of the resulting output pulse in response to a pulse of laser light, for example, is much greater than if no substrate is used. For an unsupported metallic film having induced anistropy, the thickness must be at least $1/\alpha$ where $\alpha$ is the optical absorption length in $cm^{-1}$. For a metallic film deposited on a dielectric substrate where the substrate augments or enhances the temperature gradient, the thickness of the substrate is determined by its thermal properties as well as the thermal properties of the metal. For the unsupported film, the pulse width ($T_{pulse}$) must be less than $\approx D^2/K$ where $D$ is the thickness of the metal film and $K$ is the thermal diffusivity of the metal film.

The detectors described hereinabove are two terminal devices requiring no power for their operation; are operable not only at room temperature, but also at much higher and lower temperatures; and, provide relatively high outputs over a rather wide range of the electromagnetic spectrum.

2. Description of the Prior Art

Detectors of various portions of the electromagnetic spectrum are well known in the prior art. Some utilize semiconductor materials and many require cooling to liquid helium temperatures before providing outputs. There are no known metallic detectors of electromagnetic energy which are operable at room temperature and can be fabricated so easily and simply. Indeed, one would normally expect films which are deposited at relatively high temperatures to be self-annealing (as opposed to low temperature deposition) and, under such circumstances, not contain any stresses which would induce anisotropic behavior. The anisotropic behavior of the films results in a measurable electrical output which is useful without amplification.

Summary of the Invention

The device of the present invention, in its broadest aspect, relates to a thin film of conductive material having an induced anisotropy and means for establishing a temperature gradient in the film in a direction normal to the plane of the film.

In accordance with a more specific aspect of the present invention, the means for establishing a thermal gradient includes an electrically insulating substrate disposed in supporting relationship with the film and means for locally heating the film and the substrate.

In accordance with still more specific aspects of the present invention, the device of the present invention includes means disposed externally of said conductive film to induce anisotropy in said film.

In accordance with still more specific aspects of the present invention, the means for locally heating the film and the substrate includes a short pulse laser, electron beam or other sources of focused energy which, when they impinge on the detector of the present invention, produce heat resulting in a thermal gradient in a direction normal to the film alone or a thermal gradient in the substrate and film in a direction normal to the plane of the film and substrate.

In accordance with still more specific aspects of the present invention, the device further includes at least a pair of contacts disposed on the surface of the film.

In accordance with still more specific aspects of the present invention, the conductive film is a metal and, more specifically, may be one of the transition elements.

The method of the present invention, in its broadest aspect includes the steps of producing anisotropy in a thin film of conductive material and establishing a temperature gradient in a direction normal to the plane of said film.

In accordance with the more specific aspects, the method of the present invention includes the steps of producing anisotropy in a thin film of conductive material formed on a substrate of electrically insulating materials; establishing a temperature gradient in said film and said substrate in a direction normal to the plane of said film and detecting a thermoelectric voltage at least a pair of contacts connected to said film.

The apparatus and method summarized hereinabove provides a fast response detector of electromagnetic energy which can be combined, for example, with other similar detectors to form an array of electromagnetic wave detectors. The devices shown take advantage of induced anisotropy in the film which is either permanently induced or temporarily induced by an external source. Also, the devices are capable of producing outputs the polarity of which may be varied by simply reversing the direction of energy incidence on the film surface.

It is, therefore, an object of the present invention to provide a thin film detector of electromagnetic energy particularly in the infrared portion of the spectrum.

Another object is to provide an electromagnetic wave detector which requires no power other than heating to provide an electrical output.

Still another object is to provide an electromagnetic energy detector which has a simple structure, is easily and inexpensively fabricated and is operable at room temperature.

Still another object is to provide an electromagnetic energy detector which has a relatively fast response and is capable of providing an electrical output of opposite polarities.

The foregoing and other objects, features andadvantages of the present invention will be apparent from the following more particular description of a preferred embodiment of the invention as illustrated in the accompanying drawings.

BRIEF DESCRIPTION OF DRAWINGS

FIG. 2A shows an oscilloscope in parallel with the output impedance and a waveform of negative polarity which appears on the scope.

FIG. 3A shows a waveform for front surface illumination while FIG. 3B shows a waveform resulting from back surface illumination.

DESCRIPTION OF PREFERRED EMBODIMENTS

Figure 1A:
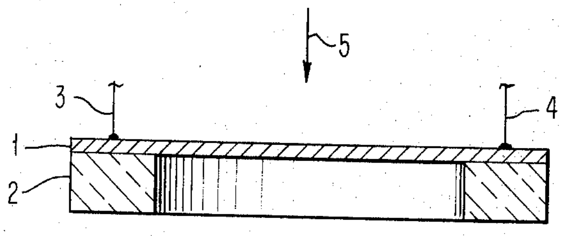
FIG. 1A is a cross-sectional view of a metallic film having induced anisotropy in accordance with the teaching of the present invention which is excited by a pulsed laser source, for example, to produce a thermoelectric voltage across a pair of terminals which are electrically connected to the surface of the film.

Referring now to FIG. 1A, there is shown therein a metal film 1 of a high melting point metal such as molybdenum or tungsten. Metal film 1 is supported only at its periphery by a dielectric substrate 2 of sapphire, quartz, pyrex or other electrically insulating material. A pair of contacts or terminals 3, 4 are electrically connected at two points on the surface of metallic film 1. A laser pulse represented in FIG. 1A by arrow 5 is applied to the surface of film 1. In general, if film 1 exhibits an induced anisotropy determined either by the conditions under which film 1 is formed or by induction from an external source such as a magnetic field, and the film is subjected to pulsed laser excitation, an output voltage is developed across contacts 3, 4. In the former instance, the induced anisotropy is permanent while in the latter instance, the induced anisotropy may be present only as long as the inducing field is applied, depending on the degree of ferromagnetism of the film.

When a laser pulse 5 impinges on film 1, a voltage which is directly proportional to the incident laser power for a fixed pulse shape is developed across terminals 3, 4. For optimum pulse shape integrity, a matching impedance (not shown) can be placed across terminals 3, 4 and the presence of the incident laser pulse on film 1 can be detected by monitoring the induced voltage on an oscilloscope placed in parallel with the impedance.

Figure 1B:
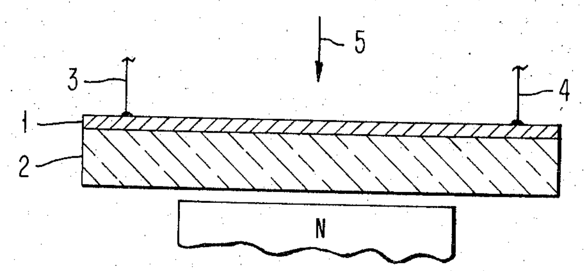
FIG. 1B is a cross-sectional view of a metallic film having induced anisotropy similar to that shown in FIG. 1A except that the metallic film is supported everywhere by a dielectric substrate. A pole piece for applying a magnetic field to externally induce anisotropy is also shown.

In FIG. 1B, a device similar to that shown in FIG. 1A is shown except that film 1 is supported everywhere by dielectric substrate 2. In the arrangement of FIG. 1B, an output voltage is developed across terminals 3, 4 which is of significantly greater amplitude than the output voltage developed across terminals 3, 4 in the arrangement of FIG. 1A. In this respect, the arrangement of FIG. 1B is a preferred embodiment. In both of the devices shown, a temperature gradient is developed in a direction normal to the plane of film 1 in either film 1 as in the instance of FIG. 1A or in both film 1 and substrate 2 as in the instance of FIG. 1B. It is the thermal gradient in combination with the induced anisotropy which unexpectedly provides an electrical output in response to an incident pulse of laser light. While a gradient can be established across film 1 in the unsupported mode of FIG. 1A, it should be clear that the gradient is very small due to the small thickness of film 1. As a result of the small gradient, only very small output voltages are developed across terminals 3, 4. The temperature gradient can, however, be maximized by utilizing a substrate which is highly thermally conducting as in the arrangement of FIG. 1B. The high thermal conductivity of substrate 2 exhibits a large gradient in response to a laser pulse applied normal to the plane of film 1. The greater the gradient, the larger is the signal output voltage developed across terminals 3, 4, provided a high power density excitation source such as a laser is utilized.

Film 1, as indicated hereinabove, must exhibit induced anisotropy to develop a voltage across terminals 3, 4 of FIGS. 1A, 1B. Where film 1 does not exhibit induced anisotropy, no voltage is developed across contacts made to such a film even though a temperature gradient exists in the film. For example, where a tungsten or molybdenum film is vacuum evaporated at high temperature, the film so deposited undergoes self-annealing to the extent that internal stresses are to a great extent relieved. With all other factors remaining the same, with the exception that vacuum deposition of tungsten or molybdenum is carried out at the lowest substrate temperature possible consistent with good adhesion, applying a laser pulse normal to the plane of the film produces an output voltage across terminals 3, 4. It is, therefore, postulated that the film exhibits induced anisotropy by virtue of the internal stresses generated in film 1 during its deposition at or near room temperature. Under such circumstances, film 1 exhibits a permanent induced anisotropy. However, anisotropy need not be permanent, but may be exhibited momentarily by a deposited film in which all internal stresses have been relieved by application of an external magnetic field, for example, particularly for ferromagnetic thin films. FIG. 1B shows a magnetic pole piece disposed near film 1 which is capable of providing a desired magnetic field. Here stress is not required since the magnetic field alone will cause the electrons to flow anisotropically due to the force produced by the product of the electron velocity times the magnetic field ($v + H$). Additional anisotropy may result because many magnetic films as grown possess anisotropic magnetization.

As indicated hereinabove, the voltage developed across terminals 3, 4 of FIGS. 1A, 1B is directly proportional to the incident laser power of fixed pulse shape; is slightly dependent on the type of substrate material and, is independent of the polarization of the incident laser beam. Voltage is a function of the thickness of film 1 insofar as the thickness of film 1 has an effect on the instantaneous temperature gradient normal to the plane of film 1. Film thicknesses in the order of 500 – 2,700 A have been investigated. The response time of film 1 is dependent on the laser pulse width. For a 5 nsec pulse, the rise time is of the order of 3–4 nsec, and the decay time is approximately 5 nsec. Shorter laser pulses produce rise times approximately equal to the pulse width. Along any given direction of film 1 as defined by the contact points of terminals 3, 4 no change in voltage is observed with the translation of the light pulse between terminals 3, 4. For the unsupported film 1 shown in FIG. 1A, the thickness of film 1 should be at least $1/\alpha$ where $\alpha$ is the optical absorption length in $cm^{-1}$. The pulse width of an incident laser pulse should not be so long that vaporization of film 1 occurs. Typically the pulse width for an unsupported film 1 should be less than $D^2/K$ where $D$ is the film thickness and $K$ is the thermal diffusivity of metal film 1. In the supported film arrangement of FIG. 1B, the substrate provides the desired temperature gradient and, as with the unsupported film, the width of the laser pulse should not be so long as to vaporize film 1. For the arrangement of FIG. 1B, the pulse width is determined by the thermal properties of both film 1 and substrate 2.

As indicated hereinabove, film 1 may be vacuum evaporated in any well known way preferably in the region of room temperature (20°C).

Film 1 can be fabricated from any electrically conductive material having a high melting temperature which is optically absorbing at some wavelengh. The transition elements including titanium, vanadium, chromium, cobalt, nickel, tantalum, tungsten, uranium, osmium, iridium, platinum, and molybdenum are ideally suited for the devices of FIG. 1A. In general, any metal or alloy having a high melting temperature which, exhibits induced anisotropy can be utilized.

Substrate 2 may be any electrically insulating substrate having good thermal conductivity. Thus, glass, quartz, alumina, or other dielectric material may be utilized. Terminals 3, 4 of FIGS. 1A, 1B may be thermally bonded to the surface of film 1 or applied thereto utilizing, for example, a silver paste or paint. Any suitable material may be utilized for contacts as long as it adheres sufficiently to film 1.

Figure 2A:
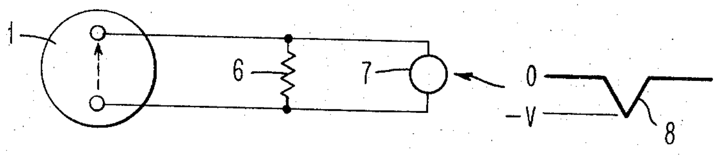
FIG. 2A is a schematic of a thin film similar to that shown in either FIG. 1A or 1B having a pair of sliding contacts in contact with the film and so arranged as to produce an output voltage across a 50 ohm impedance in response to a laser pulse incident on its surface.
Figure 2B:
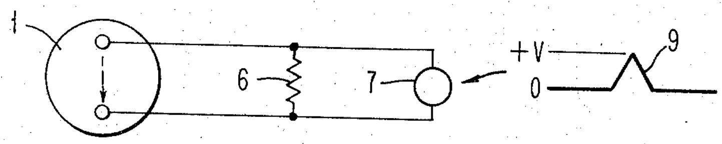
FIG. 2B is an arrangement similar to that shown in FIG. 2A except that the relative positions of the sliding contacts have been reversed in FIG. 2B. The resulting waveform, as shown in FIG. 2B has a polarity which is reversed relative to the polarity of the waveform shown in FIG. 2A.
Figure 2C:
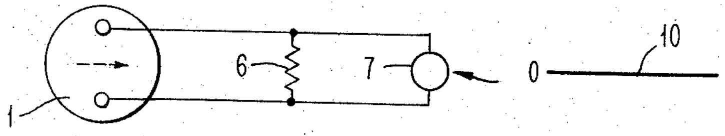
FIGS. 2C and 2D show arrangements similar to that shown in FIGS. 2A and 2B except that the contacts have been moved 90° relative to the position shown in FIGS. 2A, 2B. The waveforms indicate no output voltage.
Figure 2D:
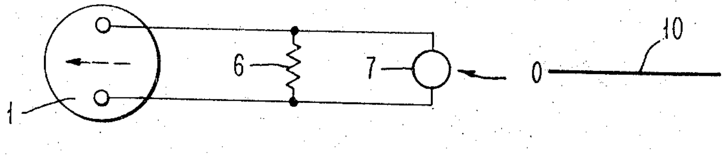
Figure 2E:
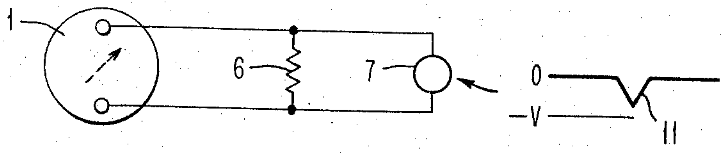
FIG. 2E shows an arrangement similar to that shown in FIG. 2A except that the contacts have been rotated 45° relative to their position in FIG. 2A. The resulting output waveform has the same polarity as the waveform of FIG. 2A except that its amplitude is substantially reduced.
Figure 2F:
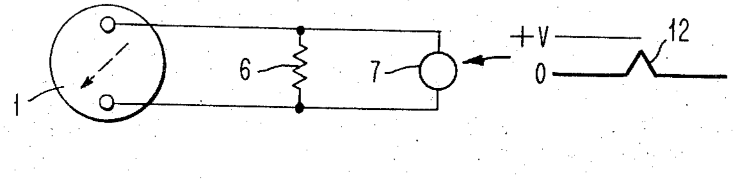
FIG. 2F shows an arrangement similar to that shown in FIG. 2B except that the contacts have been rotated 45° relative to the position shown in FIG. 2B. The resulting waveform has the same polarity as that shown in FIG. 2B except that the amplitude is substantially reduced.
Figure 3A:
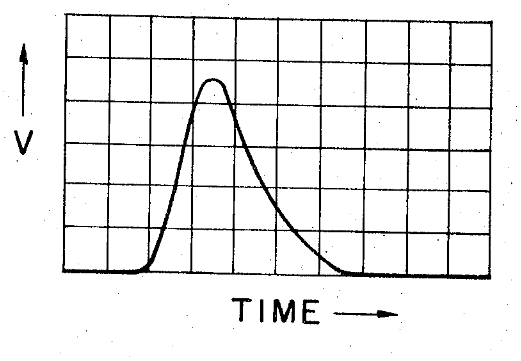
FIGS. 3A and 3B show actual oscilloscope traces of voltages from a laser excited 1800 A-thick evaporated molybdenum film disposed on a sapphire substrate. The laser excitation is at a wavelength of approximately 4600 A and has approximately a 5 nsec pulse width.
Figure 3B:
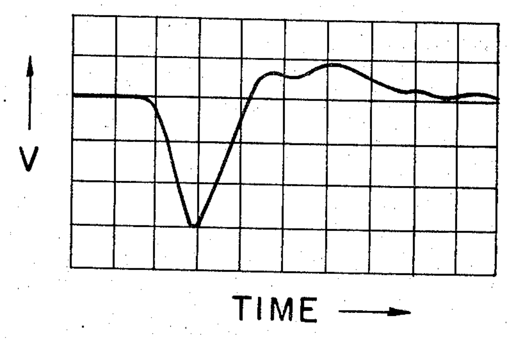

Referring now to FIG. 2A, there is shown a schematic diagram of a film 1 having an induced anisotropy to which contacts 3, 4 have been applied. An impedance 6 of approximately 50 ohms is shown connected between contacts, or terminals 3, 4. An oscilloscope schematically represented by circle 7 in FIG. 2A is shown connected in parallel with impedance 6. In FIG. 2A contacts, or terminals, 3, 4 are movable slidably relative to film 1. When a laser pulse is applied normal to the plane of film 1, a voltage is developed across impedance 6 and output waveform 8 as shown in FIG. 2A is displayed on oscilloscope 7. Waveform 8 is an idealized waveform (actual waveforms are shown in FIGS. 3A, 3B) which is intended to convey only polarity and amplitude information. As shown in FIG. 2A, waveform 8 has a negative polarity of $|V|$ amplitude which is obtained by adjusting contacts 3, 4 on the surface of film 1. By either reversing contacts 3, 4 or the orientation of film 1 180°, waveform 9 of FIG. 2B is obtained. Waveform 9 has a positive polarity and an amplitude of $|V|$. Because of the induced anisotropy of film 1, a thermoelectric voltage is generated which has a definite polarity. Accordingly, film 1, when a laser pulse produces a thermal gradient across film 1 and substrate 2, may be likened to a storage battery inasmuch as reversing the leads or reversing the battery produces a current reversal through a load connected to such a battery. By rotating the contacts 3, 4 shown in FIG. 2A, 90° counterclockwise and clockwise, the arrangements of FIGS. 2C, 2D, respectively, are obtained. When a laser pulse is directed at film 1 using either of the contact arrangements shown, there is no resulting output voltage. This is indicated by time base 10 in FIGS. 2C, 2D. By rotating contacts or electrodes 3, 4, 45° clockwise from the position shown in FIG. 2A and 45° counterclockwise from the position shown in FIG. 2B, the arrangements of FIGS. 2E, 2F, respectively, result. The arrangement of FIG. 2E produces an output of waveform 11 having the same polarity as waveform 8 of FIG. 2A, but of reduced amplitude. Similarly, the arrangement of FIG. 2F produces an output waveform 12 having the same polarity as waveform 9 of FIG. 2B but of substantially reduced amplitude ($\approx .7|V|$).

From the foregoing, it should be clear that the contact orientation relative to the orientation of the transverse voltage generated may be utilized to provide, with the same laser pulse conditions, outputs having different amplitudes and polarities. It should also be clear that the resulting thermoelectric voltage is a function of the presence of induced anisotropy; in this instance appearing in the form of internal stress in film 1.

As indicated hereinabove, induced anisotropy may result from externally applied means such as magnetic fields or, it may be augmented or enhanced when it appears in the form of internal stress by thermally treating an arrangement wherein film 1 and substrate 2 have rather large differences in their coefficients of thermal expansion. With respect to the latter, a film of molybdenum deposited at room temperature on a substrate of vitreous quartz may be thermally cycled to a temperature of 600° C. After thermally cycling, the same laser pulse produces an output which is ≈4 times greater in amplitude than prior to thermal treatment. From this, it may be seen that self annealing can be avoided provided the coefficients of thermal expansion of the metal film and the substrate are sufficiently different to produce internal stresses in film 1 upon cooling. With respect to the inducing of anisotropy by external means, a magnetic field may be applied either by a permanent magnet or by an electromagnet such that the lines of force tend to orient the spins of the metal film. Under such circumstances, the film 1 is subjected to a magnetic induced anisotropy which results in an output voltage when the film is irradiated with a laser pulse.

On an experimental level, focused laser light directed onto an evaporated molybdenum film deposited on a transparent sapphire substrate provided the oscilloscope traces shown in FIGS. 3A, 3B, for front and back surface illumination, respectively. The evaporated molybdenum film is approximately 1800 A in thickness while the laser excitation wavelength is approximately 4600 A at a pulse width of approximately 5 nsec. In FIG. 3A, the vertical axis represents voltage at 0.2 *V*/cm while the horizontal axis represents 5 nsec/cm. For FIG. 3B, coordinates are 0.1 *V*/cm and 5 nsec/cm. (Here, an amplifier with voltage gain of 100 has also been used for both FIGS. 3A and 3B).

FIGS. 3A and 3B are representative signals in terms of their polarity for metallic films having induced anisotropy. Thus, FIG. 3A provides an output for light incident on the metal film side while FIG. 3B is for light incident through the sapphire substrate. The features of particular interest are (1) the reversal in voltage polarity as a function of the direction of light incidence and a slow decay above the base line in FIG. 3B after termination of the laser pulse. An explanation for these features as well as the more general ones already described is in terms of the thermoelectric power. The relevant solution to the Boltzmann transport equation is for the current density J, $$J_i = K_{ij}E_j + K'_{ij} \nabla T_j \quad (1)$$

Here $K_{ij}$ and $K'_{ij}$ are matrix elements of second rank tensors, (scalar for cubic symmetry and isotropic media), E is the electric field and $T$ the temperature. (Repeated indices are summed throughout). With the approximation $J = O$, expressions for the transverse voltage, $V_{x,y}$ (open circuit voltage) in the plane of the film become, $$V_x = \int (K^{-1})_{xi} K'_{ij} \nabla T_j dx \quad (2)$$

$$V_y = \int (K^{-1})_{yi} K'_{ij} \nabla T_j dy \quad (3)$$

The integration is taken over the region between the electrodes. $K^{-1}K'$ is the negative of the absolute thermoelectric power tensor. For a circularly symmetric beam, the only contributing component of the temperature gradient to $V_{x,y}$ is $\nabla T_z$. From Eqs. 1–3 it is clear that a voltage reversal will occur between front and back illumination (FIGS. 3A and 3B). A more complete time dependent temperature profile is required to interpret details of the observed signals.

Figure 4A:
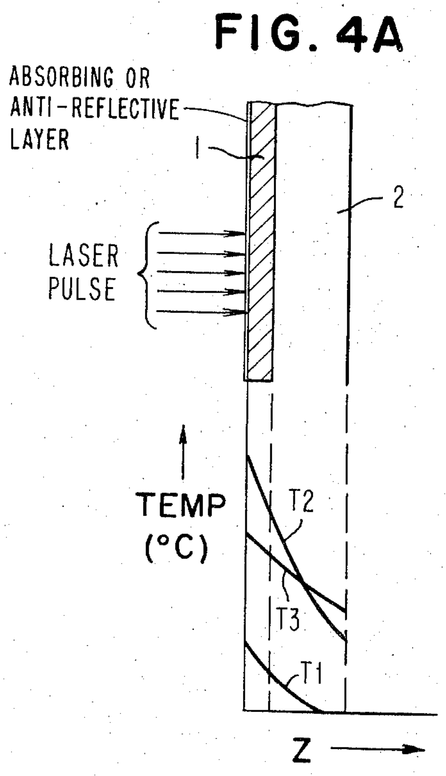
FIGS. 4A and 4B show plots of temperature above ambient versus position for front and back illumination by a pulsed laser, respectively, for approximately 5 nsec laser excitation. The profiles obtained are for time T1 which is shortly after laser pulse initiation, for time T2, a time just prior to pulse termination and for T3, a time shortly after pulse termination (cooling).
Figure 4B:
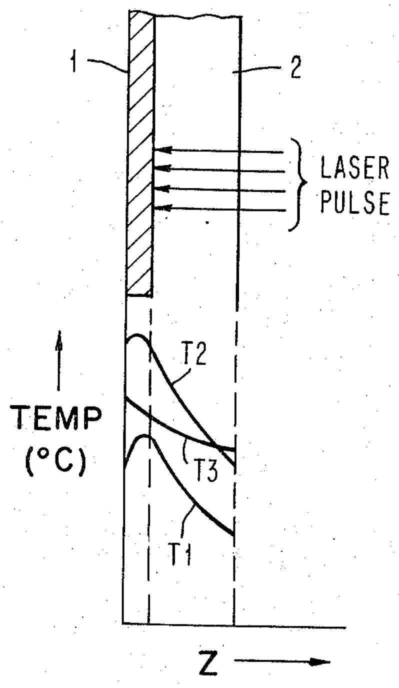

In FIGS. 4A, 4B, general results obtained from computer solutions to the three dimensional heat flow equations for multilayered thin film structures are shown. FIGS. 4A and 4B show a plot of temperature above ambient versus position for front and back illumination, respectively, for approximately 5 nsec laser pulse excitation. The profiles obtained are for time T1 which is shortly after laser pulse initiation, for time T2, a time just prior to pulse termination and, for T3, a time shortly after pulse termination. The program utilized has been described in an article by R. J. von Gutfeld et al. in the *Journal of Applied Physics*, 43, 4688 (1972). The general results for five nsec laser pulses are in agreement with other calculations using a one dimensional analysis for longer pulse widths.

In FIG. 4A, a monotonically increasing temperature and temperature gradient are shown during the application of the laser pulse (curves T1 and T2). After termination of the pulse (approximately 5 nsec), both temperature and temperature gradient decrease with time as film 1 and substrate 2 undergo cooling, ultimately by radial thermal spreading (curve T3).

FIG. 4B shows the resulting temperature profiles for light incident through the transparent sapphire substrate 2 which would produce a signal corresponding to that shown in FIG. 3B. For a film thickness greater than the reciprocal optical absorption length, a temperature maximum occurs to the left of the film-substrate interface. As the light pulse persists, the maximum moves towards the front face (free surface) of film 1. Thus, for short pulses there are two temperature gradients of opposite sign as shown by T1. The average gradient is in the opposite sense to that of FIG. 4A, hence the voltage has opposite polarity to that obtained from illumination of the free surface of film 1. After pulse termination, T3 indicates a reversal in sign of the gradient from that predominating in curve T1 which correlates well with that part of the signal above the base line in FIG. 3B. For illumination through the sapphire substrate 2, an increase of approximately 10 percent is observed in the maximum signal when a drop of water is placed on the free surface of film 1. An increase is expected since the initial effect is one that increases the negative temperature gradient (T1 of FIG. 4B) in film 1. For pulses longer than approximately 10 nsec, the average temperature gradient in the film descreases with increasing pulse length for both front and back illumination. Thus, long laser pulse excitations tend to produce voltages shorter than the actual laser pulse. For half-widths of approximately 300 nsec the detected thermoelectric voltage pulses exhibit approximately 200 nsec half-widths.

Finally, to relate the nonscalar nature of $K_{ij}$ and $K'_{ij}$ to film stress, an article entitled "Intrinsic Stress in Evaporated Metal Films" by E. Klokholm and B. S. Berry, *Journal of Electrochemical Society*, 115, 823 (1968) should be considered. This paper relates to in situ measurements of intrinsic stress in a number of films on glass substrates. For similar tensile stresses, the stress tensor elements in films of the present invention are $$o_{ij}\ (i \neq j) = o_{33} = 0,\ o_{11} = o_{22} = o$$

so that the anisotropic strain ($\epsilon$) in terms of the compliance constants $o_{ij}$ becomes:

$$\epsilon_x = (S_{11} + S_{12})o$$
$$\epsilon_y = (S_{12} + S_{11})o \qquad (4)$$
$$\epsilon_z = 2S_{12}o$$

Equations (4) predict a distortion from film isotropy and hence a tensorial form for $K_{ij}K'_{ij}$. What initially fixes the direction of | V max | in the plane of the film while not yet clearly understood may be attributed to the direction of grain growth in the film during deposition for those cases where a magnetic field is not used.

To ascertain a correlation between stress and magnitude of the thermoelectric voltage, a series of films of approximately equal thickness was evaporated at two different temperatures, 150°C and 450°C. For a molybdenum film on a sapphire substrate, the film grown at the higher temperature gave a signal approximately a factor of five to ten smaller than for the film grown on the substrate at 150°C.. This result is in agreement with the theory of the Klokholm et al article mentioned hereinabove where the ingrown film stress is predicted to become small in the range $T_s/T_m$ greater than one-quarter where $T_s$ is the absolute substrate temperature during deposition and $T_m$ is the absolute melt temperature of the metal film. A comparison of the photovoltage was also made between an 1800 A tungsten film evaporated on a sapphire substrate at 150°C and a low stressed epitaxially grown 1000 A thick film on a sapphire substrate. The voltages produced in the latter arrangement were approximately 5 times smaller.

The effect of operating the thin films at elevated temperatures has been studied up to 250°C. An approximately linear increase in output signal is observed with an approximately 15 percent increase in output voltage at 250°C compared to room temperature. This increase corresponds approximately to a linear dependence of the photovoltage on stress, with the tensile stress increasing approximately as differential thermal expansion and temperature above ambient.

Other observations using molybdenum on vitreous quartz substrates where the metal film and the substrates have drastically different coefficients of expansion have shown that it is possible to enhance the output voltage by depositing the metal film at room temperature, thermally cycling to approximately 600°C and permitting device to cool to room temperature. Further heating to 800°C in vacuuo seems to produce annealing with a resulting large diminution of the thermoelectric effect.

While anti-reflection coatings are not necessary in the practice of the present invention over a large portion of the electromagnetic spectrum in question, operation in the infra red region of the spectrum (for wavelengths greater than 3 microns) is greatly enhanced by the formation of an anti-reflection coating (typically one-quarter wavelength thick) of germanium or lithium fluoride, for example. Alternatively, absorbing thin layers can be utilized. This expedient is used because of the high reflectivity of metals in the infrared region a coating or layer having the characteristics described above is indicated in FIG. 4A.

Thus, it appears that evaporated or vacuum deposited metallic films having induced anisotropy in accordance with the teaching of the present invention offer promising possibilities as fast optical pulse detectors over a wider range of temperatures and wave lengths and, in addition, provide an interesting tool for the study of stresses in thin films.

While the invention has been particularly shown with reference to preferred embodiments thereof, it will be understood by those skilled in the art that the foregoing and other changes in form and details may be made therein within departing from the spirit and scope of the invention. What is claimed is:

1. A detector of electromagnetic waves comprising:

a thin film of conductive material having an induced anisotropy,
means for establishing a temperature gradient in said film in a direction normal to the plane of said film, and
at least a pair of contacts electrically conneced to said film for developing an electrical signal between them.

2. A detector according to claim 1 wherein said conductive material is a metallic material.

3. A detector according to claim 1 further including means disposed externally of said thin film for inducing anisotropy in said film.

4. A detector according to claim 1 further including means responsive to the presence of an electrical signal electrically connected to said thin film.

5. A detector according to claim 1 wherein said means for establishing a temperature gradient includes means for locally heating said thin film.

6. A detector according to claim 1 wherein said means for establishing a temperature gradient includes an electrically insulating substrate disposed in supporting relationship with said film and means for heating a portion of said thin film and said substrate.

7. A detector according to claim 1 wherein said means for establishing a temperature gradient includes an electrically insulating substrate disposed in supporting relationship with said film, means for heating a portion of said thin film and said substrate and means for enhancing the establishment of a temperature gradient disposed in overlying relationship with said thin film.

8. A detector according to claim 1 wherein said pair of contacts are slidable contacts disposed in slidably engaging relationship with said thin film.

9. A detector according to claim 2 wherein said metallic material is transition metal.

10. A detector according to claim 2 wherein said metallic material is one selected from the group consisting of titanium, vanadium, chromium, cobalt, nickel, iron, tantalum, tungsten, uranium, osmium, indium, platinum and molybdenum.

11. A detector according to claim 3 wherein said means for inducing anisotropy includes means for applying a magnetic field to said thin film.

12. A detector according to claim 5 wherein said means for locally heating is a laser.

13. A detector according to claim 5 wherein said means for locally heating is an electron beam source.

14. A detector according to claim 6 wherein said means for locally heating is a laser.

15. A detector according to claim 6 wherein said means for locally heating is an electron beam source.

16. A detector according to claim 7 wherein said means for locally heating is a laser.

17. A detector according to claim 7 wherein said means for locally heating is an electron beam source.

18. A detector according to claim 7 wherein said means for enhancing includes an anti-reflection layer disposed in overlying relationship with said thin film.

19. A detector according to claim 7 wherein said means for enhancing includes at least a thin layer of material which is absorbing at at least the wavelength of the electromagnetic wave being detected disposed in overlying relationship with said thin film.

20. A detector according to claim 18 wherein said anti-reflection layer is one-quarter wavelength thick at the wavelength of the electromagnetic wavelength being detected.

21. A method for detecting electromagnetic waves comprising the steps of:

producing anisotropy in a thin film of conductive material, establishing a temperature gradient in said film in a direction normal to the plane of said film and, detecting a thermoelectric voltage at at least a pair of contacts connected to said film.

22. A method according to claim 21 wherein the step of producing anisotropy in a thin film includes the step of:

forming said thin film at a temperature sufficient to produce internal stress in said thin film.

23. A method according to claim 21 wherein the step of producing anisotropy in a thin includes the step of:

applying a magnetic field to said thin film.

24. A method according to claim 21 wherein the step of establishing a temperature gradient includes the step of:

heating a portion of said thin film with pulsed energy,

25. A method according to claim 21 further including the step of:

applying to the surface of said thin film a layer of material adapted to enhance the establishment of a temperature gradient in said thin film.

26. A method for detecting electromagnetic waves comprising the steps of:

producing anisotropy in a thin film of conductive material formed on a substrate of electrically insulating material, establishing a temperature gradient in said film and said substrate with a component in a direction normal to the plane of said film, and detecting a thermoelectric voltage at at least a pair of contacts connected to said film.

27. A method according to claim 26 wherein the step of producing anisotropy in a thin film includes the step of:

forming said thin film at a temperature sufficient to produce internal stress in said thin film.

28. A method according to claim 26 wherein the step of producing anisotropy in a thin film includes the step of:

applying a magnetic field to said thin film.

29. A method according to claim 26 wherein the step of establishing a temperature gradient includes the step of:

heating a portion of said film and said substrate with focused energy.

30. A method according to claim 26 further including the step of:

applying to the surface of said thin film a layer of material adapted to enhance the establishment of a temperature gradient in said thin film.

31. A method according to claim 26 wherein the step of producing anisotropy in a thin film includes the steps of:

forming said thin film on a substrate having coefficient of thermal expansion different from that of said resulting film at a temperature sufficient to produce internal stress in said film, heating said substrate and said film to a temperature insufficient to cause annealing but sufficient to enhance internal stress in said film, and cooling said substrate and said film to room tmperature.

32. A method according to claim 31 wherein said thin film is molybdenum, said substrate is vitreous quartz and said heating is to a temperature of approximately 600°C.

33. A method according to claim 31 wherein the step of establishing a temperature gradient includes the step of:

heating a portion of said film and said substrate with focused energy.

34. A method according to claim 31 further including the step of:

applying to the surface of said thin film a layer of material adapted to enhance the establishment of a temperature gradient in said thin film.

* * * * *